United States Patent [19]

Olson et al.

[11] 4,111,038

[45] Sep. 5, 1978

[54] METHOD AND APPARATUS FOR DETERMINING THE CENTER OF GRAVITY OF A GOLF BALL

[75] Inventors: Robert E. Olson; James R. Braun, both of San Antonio, Tex.

[73] Assignee: Ray Cook Golf Putters, Inc., San Antonio, Tex.

[21] Appl. No.: 729,728

[22] Filed: Oct. 5, 1976

[51] Int. Cl.² .............................................. G01M 1/14
[52] U.S. Cl. .......................................... 73/65; 73/66
[58] Field of Search ........................... 73/65, 66, 483

[56] References Cited

U.S. PATENT DOCUMENTS

| 3,156,067 | 11/1964 | Malko ................................. 73/483 |
| 3,161,041 | 12/1964 | Amburget ............................. 73/65 |

OTHER PUBLICATIONS

"Manufacture of Bowling Balls at Stowe-Woodward", Rubber Age, Aug. 1954, pp. 688-689.

*Primary Examiner*—Charles A. Ruehl
*Attorney, Agent, or Firm*—Cox, Smith, Smith, Hale & Guenther Incorporated

[57] ABSTRACT

This invention is a kit and method for testing golf balls to determine if the center of gravity is the center of the golf ball. The kit uses a liquid, such as water, having a densifying agent to increase the density of the liquid solution so a golf ball will float when placed in the solution. A wetting agent is also included in the solution to decrease the surface tension. If a golf ball, having a center of gravity at other than the center of the golf ball, is placed in the solution, the light side of the ball will rotate to the top. The light side is then marked with an indelible marker. An axis through the center of the golf ball and the mark also includes the center of gravity of the golf ball. Thereafter, the axis of the golf ball including the mark, should always be placed perpendicular to the plane of the striking surface.

9 Claims, 6 Drawing Figures

U.S. Patent  Sept. 5, 1978  4,111,038
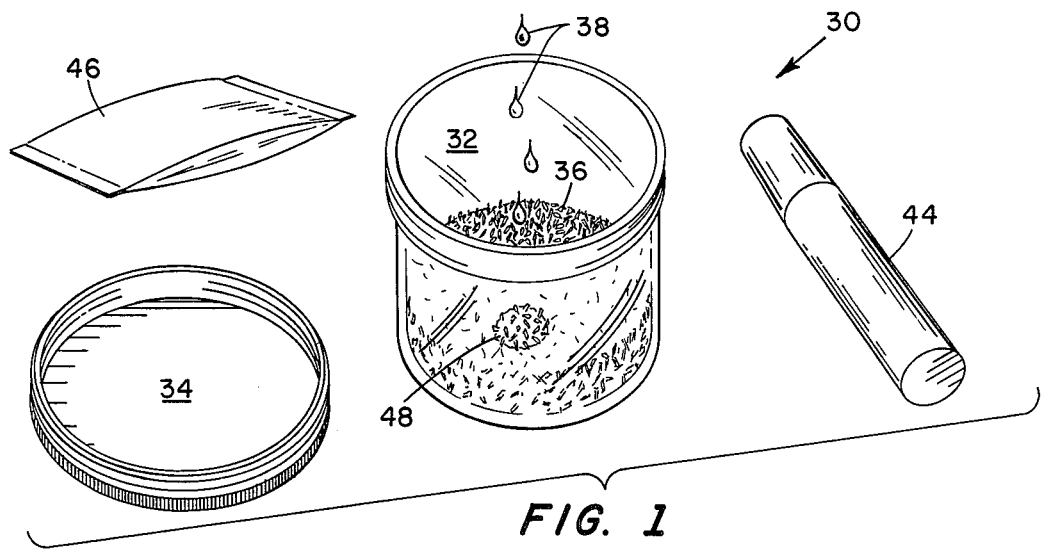
FIG. 1
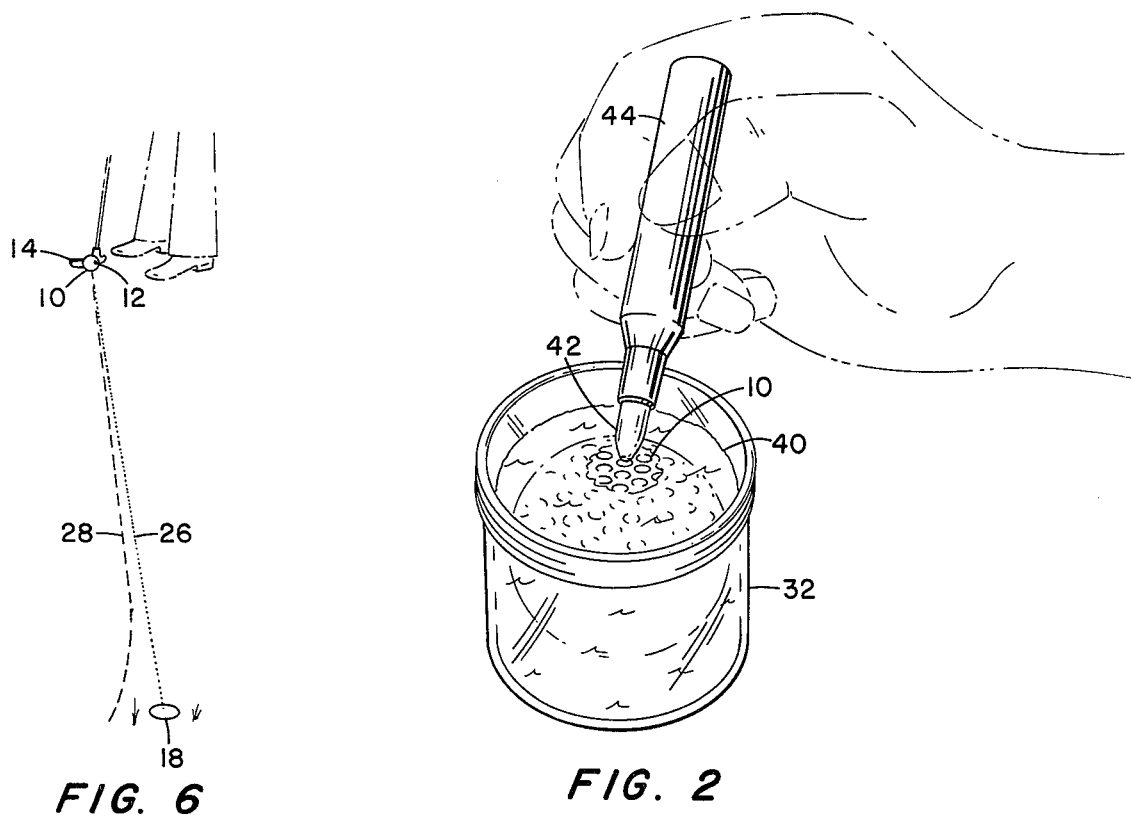
FIG. 6
FIG. 2
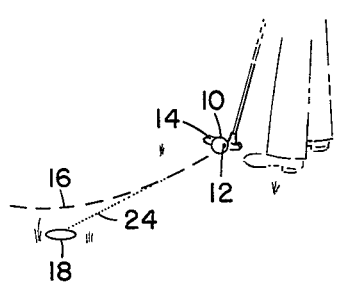
FIG. 3
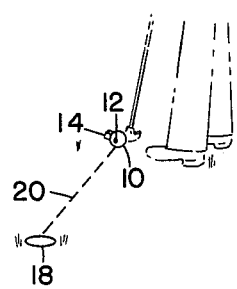
FIG. 4
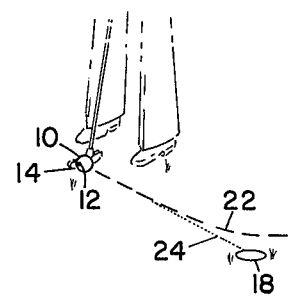
FIG. 5

METHOD AND APPARATUS FOR DETERMINING THE CENTER OF GRAVITY OF A GOLF BALL

BACKGROUND OF THE INVENTION

This invention relates to a method and apparatus for determining an axis of a golf ball along which an off-center center of gravity of the golf ball is located. The kit includes a common liquid (such as water) with a densifying agent to increase the density so the golf ball would float. A wetting agent is added to reduce the surface tension of the water. After mixing the solution, the golf ball is tested for imbalance by flotation in the solution. If a particular point continually raises to the top, that point represents the light side of the ball and may be marked by an indelible marker. An axis through the mark and the center of the ball will also extend through the center of gravity of the ball.

BRIEF DESCRIPTION OF THE PRIOR ART

Prior to the present invention, golfers have automatically assumed that golf balls are uniformally manufactured with the center of gravity being in the center of the ball. When a golfer would putt a golf ball, and the ball would break right or left, the break would be attributed to either the green or the putting stroke of the golfer. The manufacturers of sporting goods, especially manufacturers of golf balls, have never mentioned the problem of unbalanced golf balls having a center of gravity at other than the center of the balls. Naturally, a manufacturer of golf balls would never admit their golf balls were unbalanced. However, applicants have shown by a putting machine that simulates a perfect putting stroke that unbalanced golf balls have a tendency to break to the right or left depending upon how the particular ball is positioned. The evaluation of this phenomenon by applicants lead to the discovery of the present invention.

SUMMARY OF THE INVENTION

The present invention includes a kit for testing golf balls to determine the axis of an unbalanced golf ball along which the center of gravity is located. The kit includes a common liquid (such as water) with a densifying agent to increase the density of the liquid so that the golf ball will float. The surface tension of the solution formed by the liquid and the densifying agent is reduced to insure that a golf ball is free to rotate in the solution by adding a wetting agent. By thoroughly mixing the densifying agent, the wetting agent and the liquid in a container, the golf ball may be floated in the solution.

If the golf ball being floated in the solution has a center of gravity other than the center of the ball, the heavy side will rotate to the lowermost portion of the ball with the light side exending slightly above the surface of the solution. The light side may then be marked with an indelible marker to permanently indicate the light side of the golf ball. Thereafter, if the dot is placed along an axis of the golf ball perpendicular to the striking face of a putter or club, that axis will include the center of gravity of the golf ball. However, if the dot is located on the right side of the axis of the golf ball perpendicular to the striking face, the golf ball will curve to the left during putting. Likewise, if the dot is located on the left, the golf ball will curve to the right. This phenomenon known as "precession" is defined as "a comparatively slow gyration of the rotational axis of a spinning body about another line intersecting it so as to describe a cone caused by the application of a torque tending to change the direction of the rotational axis". (Webster's New Collegiate Dictionary, G. & C. Merriam Company, 1973).

It is an object of the present invention to provide a kit for the testing of golf balls to determine their center of gravity. The kit includes a container having a solution comprising a liquid and densifying agent to increase the density of the solution slightly above the density of the golf balls, and a wetting agent to decrease the surface tension of the solution. An acrylic marker is used to provide an indelible spot on the light side of the balls. Additional densifying agents may be included in the solution to further increase the density of the solution to float European golf balls, which are more dense than American golf balls.

It is another object of the present invention to provide a method for testing golf balls to determine the axis of unbalanced golf balls which includes their center of gravity. The method includes the mixing of a densifying agent and wetting agent with a common liquid (such as water) to form a solution. Thereafter, the golf ball is floated in the solution. If a particular spot on the ball continually rises to the top, that spot is marked. Thereafter, that spot is always located along an axis perpendicular to the striking surface of a putter to prevent the precession effect.

BRIEF DESCRIPTION OF THE DRAWINGS

FIG. 1 is a perspective view of the elements of a kit for testing golf balls to determine an axis of unbalanced golf balls including their center of gravity.

FIG. 2 is an environmental perspective view of the kit being used to determine the axis of an unbalanced golf ball including its center of gravity.

FIG. 3 is an environmental view of an unbalanced golf ball being putted for a short putt with its center of gravity being located to the right of an axis perpendicular to the striking surface of a putter.

FIG. 4 is an environmental view of an unbalanced golf ball being putted for a short putt with its center of gravity being located along an axis perpendicular to the striking surface of a putter.

FIG. 5 is an environmental view of an unbalanced golf ball being putted for a short putt with its center of gravity being located to the left of an axis perpendicular to the striking surface of a putter.

FIG. 6 is an environmental view of an unbalanced golf ball being putted for a long putt with its center of gravity being located to the right of an axis perpendicular to the striking surface of a putter.

DESCRIPTION OF THE PREFERRED EMBODIMENT

Ray Cook Golf Putters, Inc., assignee of the present invention, developed and built a putting machine to simulate a perfect putting stroke. With the machine mounted on a perfectly flat, level surface covered with a material to simulate a golf green, the putting machine was used to test putters. During the testing, it was observed that a golf ball struck repeatedly on the same position of the putter face with an identical force would travel a different path toward a target located approximately 7 feet away. To investigate the phenomenon, applicants began a series of tests on new golf balls to determine if the golf balls caused the variations in the paths of the golf balls. After considerable testing and evaluation of the golf balls, it was determined that the center of gravity of the golf balls was not the geometric center of the golf balls.

After considerable testing by applicants, it was discovered that a golf ball could be floated in a liquid (such as water) with a densifying agent to increase the density of the water to allow the golf ball to float, and a wetting agent to reduce the surface tension so that the golf ball would freely rotate in the water. If one point on the golf ball continually rose to the surface, that point would be along an axis through the geometric center of the golf ball and its center of gravity. The center of gravity (the heavy side of the golf ball) would rotate to the bottom with the light side of the golf ball rotating to the top. Because the golf ball will barely float in the solution, the top of the golf ball would barely extend above the surface of the solution.

Referring first to FIG. 3 of the drawings, assume that an unbalanced golf ball 10 has been marked by a dot 12, which dot is along the axis of the golf ball 10 including its geometric center and its center of gravity. If an individual putted golf ball 10 with putter 14 towards cup 18 as shown in FIG. 3 for a short putt, the golf ball 10 would follow path 16 as indicated in broken lines. The golf ball 10 veers to the right because its center of gravity is located on the right side opposite dot 12.

Next, if an individual used the same putter 14 and golf ball 10 with the dot 12 being aligned with an axis through the geometric center of the golf ball that is perpendicular to the striking face of putter 14, the golf ball 10 would follow path 20 for a short putt to cup 18.

Assume now that the same golf ball 10 is again struck with putter 14 with the dot 12 being located to the right of an axis through the geometric center of the golf ball 10 perpendicular to the striking face of putter 14. If an individual putting the golf ball 10 as shown in FIG. 5 is aiming for cup 18, the golf ball 10 will follow path 22 to the right of cup 18.

While the description of FIGS. 3, 4 & 5 as given in the above paragraphs is referring to short putts of approximately 10 feet of an unbalanced golf ball, a slightly different phenomenon would occur for long putts. During a short putt, the golf ball 10 initially moves toward the cup 18 as represented by dotted line 24 in FIGS. 3 & 5, but with the golf ball 10 veering either to the right or left as the ball slows down in its approach to cup 18.

Assume that the same unbalanced golf ball 10 is being used for a long putt by putter 14 with the dot 12 being located to the left as shown in FIG. 6. While dotted line 26 should represent the path of the golf ball 10, the golf ball 10 will follow path 28 as shown in broken lines. During the long putt, it has been found that the path 28 of the golf ball 10 will be at an angle, rather than perpendiular, to the striking face of putter 14 as it leaves the striking face of putter 14. The reason for the angle in the path of the golf ball 10 as it leaves the striking surface results from a torque exerted on the golf ball 10 around its center of gravity, which torque causes the initial variation of the path 28 of the golf ball 10 as it leaves the putter striking surface. The torque is caused by the variation between the axis through the geometric center of the golf ball 10 perpendicular to the striking surface of putter 14, and the distance from the center of gravity of the golf ball 10 to the aforementioned axis through the geometric center.

The phenomenon described in conjunction wit FIGS. 3-6 is due to the effect of "precession". In other words, the golf ball 10 during a short putt will begin rotating about a line parallel to the surface of putter 14 due to friction between the golf ball 10 and the surface of the green. However, the rotational axis of the golf ball 10 will have a comparatively slow gyration created by a torque about its center of gravity thereby tending to change the direction of the rotational axis.

Referring now to FIG. 1 of the drawings, there is shown a kit (represented generally by the reference numeral 30) for locating the center of gravity of unbalanced golf balls. The kit includes a container 32 that must be large enough for a golf ball to be inserted therein. The container 32 may be made from clear plastic or any other type of suitable substance. In the preferred embodiment, the container 32 has a lid 34 that may be threadably connected thereto. Inside of the container 32 is located a densifying agent 36. Added to the densifying agent 36 are several drops of a wetting agent 38. By adding water to the container 32, and mixing with the densifying agent 36 and wetting agent 38, a solution is now prepared which will float a golf ball therein. The wetting agent 38 will reduce the surface tension so that the golf ball will be free to rotate in the solution.

Assume now that a golf ball 10 is placed inside the solution 40 in container 32 as shown in FIG. 2. Since the center of gravity of the golf ball 10 is not the geometric center of the golf ball 10, the light side of the golf ball 10 will rotate to the surface. By turning the golf ball 10 inside of the solution 40 and releasing the golf ball 10, if the same point returns to the surface, that point is on an axis of the golf ball 10 that includes its geometric center and its center of gravity. The portion of the golf ball 10 at the surface is the light side of the golf ball 10, with the heavy side of the golf ball 10 being the lower portion submerged in solution 40. By marking golf ball 10 with a dot 12 (previously described in conjunction with FIGS. 3-6), the axis of the golf ball 10 that includes its geometric center and its center of gravity has been located. The dot 12 should be an indelible mark. A convenient method of making the dot 12 is with the felt tip 42 of an acrylic marker 44.

By considerable testing, applicants have determined that water may be used as the liquid in the solution 40 for floating golf ball 10. Since the density of water is less than the density of golf ball 10, the golf ball 10 would normally sink to the bottom if only water was used. However, by use of a densifying agent 36, the density of the water may be increased above the density of the golf ball 10. A typical densifying agent found particularly suitable by applicants is magnesium sulfate symbolized by $MgSo_4$. The principal component of Epsom Salts manufactured by Dow Chemical Company in Midland, Michigan is magnesium sulfate. While magnesium sulfate or Epsom Salts are found to be particularly suited as the densifying agent 36 to increase the density of water, many other types of densifying agents that are water soluble could be used.

While other types of wetting agents 38 may be used to reduce the surface tension of water to allow for free rotation of golf ball 10 in solution 40, a wetting agent 38 sold under the trademark JET DRY by Economic Laboratories, Inc. in St. Paul, Minnesota, has been found to be particularly suited to reduce the surface tension. JET DRY includes primarily propylene glycol ($C_3H_8O_2$), as well as ethylene oxide manufactured from unsaturated hydrocarbons and other minor ingredients.

For the floating of the American golf ball in solution 40, applicants have found that the proportions by weight of the ingredients for the solution 40 to be as given in the following table:

TABLE

| WEIGHT | INGREDIENT |
| --- | --- |
| 1.8 oz. | Magnesium sulfate |
| .01 oz. | JET DRY |
| 3.0 oz. | Water |

The water or magnesium sulfate may be varied as much as plus or minus 10%; however, the wetting agent may be varied over a considerably greater range.

To insure that the magnesium sulfate is completely dissolved in the water, warm water that may be obtained from a hot water faucet or other convenient source, is particularly desirable.

The kit as shown in FIG. 1 does not include the water as part of the kit, but water is added immediately prior to use. The wetting agent 38, which is approximately 4-6 drops, is readily absorbed by the densifying agent 36 located in container 32. The wetting agent 38 will remain in the densifying agent 36 as lump 48 until mixed with water to form solution 40.

If a person desires to use the kit 30 to determine the center of gravity of a European golf ball, the densifying agent 36 would have to be increased by approximately 50%. As part of the kit 30, a package of extra densifying agent 46 is included for the testing of European golf balls. Both the American and European golf balls weigh approximately 1.62 oz.; however, the diameter of the American golf ball is approximately 1.68 in. whereas the European golf ball is approximately 1.62 in.

We claim:

1. A method of determining the axis of an unbalanced golf ball which axis includes its geometric center and its center of gravity comprising the steps of:
    placing a golf ball in a solution consisting of a predetermined quantity of a liquid, a densifying agent and a wetting agent, the proportions of said liquid and said densifying agent being such that said solution will float said golf ball with only a minor portion of the ball being exposed above the surface of said solution, said wetting agent decreasing the surface tension of said solution to allow free rotation of said golf ball;
    rotating said ball in said solution;
    allowing said ball to come to rest in said solution, determining the uppermost point on said ball;
    subsequently rotating said ball to determine if the previously determined uppermost point returns to the top following the subsequent rotation.

2. The method of claim 1 including the additional step of marking said uppermost point.

3. The method of claim 1 wherein said liquid is water.

4. The method described in claim 3 wherein said marking includes use of an indelible marker that will permanently mark a wet surface.

5. The method as described in claim 1 wherein said solution comprises 1.8 oz. of said densifying agent, 0.01 oz. of said wetting agent and 3 oz. of water as said liquid, variation of said densifying agent in said water being no more than 10% by weight, but considerably larger variations for said wetting agent.

6. An apparatus for determining the axis of an unbalanced golf ball which axis includes its geometric center and its center of gravity, said apparatus comprising:
    container means for receiving said golf ball therein;
    a solution in said container consisting of a predetermined quantity of a liquid, a densifying agent and a wetting agent, the proportions of said liquid and said densifying agent being such that said solution will float a golf ball with only the minor portion of the ball being exposed above the surface of said solution, said wetting agent decreasing surface tension of said solution to allow free rotation of said golf ball in said container means upon flotation therein so that a heavy side of said golf ball rotates to the bottom thereof; and
    marker means for marking the top of said golf ball upon stopping said rotation.

7. The apparatus as recited in claim 6 wherein in said liquid is water and said marker means is an indelible marker.

8. The apparatus of claim 7 wherein said densifying agent is approximately 37% by weight and said water is approximately 62% by weight of said solution within a range of 10%.

9. The apparatus of claim 8 wherein said densifying agent is principally magnesium sulfate and said wetting agent is principally propylene glycol.

* * * * *